United States Patent
Nagashima

[11] Patent Number: 5,987,753
[45] Date of Patent: Nov. 23, 1999

[54] HAND-HELD POWER WORKING MACHINE

[75] Inventor: Akira Nagashima, Kanagawa, Japan

[73] Assignee: Kioritz Corporation, Tokyo, Japan

[21] Appl. No.: 09/085,813

[22] Filed: May 27, 1998

[30] Foreign Application Priority Data

May 27, 1997 [JP] Japan ..................... 9-136556

[51] Int. Cl.[6] .................................................. B26B 19/12
[52] U.S. Cl. ............................................. 30/216; 30/223
[58] Field of Search ............................ 30/208, 216, 223, 30/224

[56] References Cited

U.S. PATENT DOCUMENTS 4,592,143  6/1986  Pizzuto et al. ........................ 30/216
5,075,972  12/1991  Huang ................................ 30/216
5,426,856  6/1995  Aiyama et al. .

FOREIGN PATENT DOCUMENTS 2189179  10/1987  United Kingdom ................. 30/216

Primary Examiner—Hwei-Slu Payer
Attorney, Agent, or Firm—Baker & Botts, L.L.P.

[57] ABSTRACT

A hand-held power working machine which is capable of reducing the weight of the clipper blades, capable of being suitably heat-treated in the manufacture thereof, and capable of minimizing the stress concentration at the slot portions during the operation thereof. The clipper blades comprise a large number of cutting edges, and a large number of slots formed along a full length of each of the clipper blades; wherein the pitch of array of the cutting edges is substantially the same as the pitch of array of the slots.

6 Claims, 3 Drawing Sheets

PRIOR ART

HAND-HELD POWER WORKING MACHINE

BACKGROUND OF THE INVENTION

This invention relates to clipper blades (toothed blades) of a power working machine, and in particular to the clipper blades of a hand-held power working machine such as a hedge trimmer.

A hand-held power working machine such as a hedge trimmer is generally constituted by a prime mover case having a prime mover such as an internal combustion engine, a mount base portion surrounding a transmission case having a power transmission device such as gears to be actuated by the prime mover, a working portion comprising the clipper blades to be actuated via the aforementioned power transmission device by the prime mover, and a handling portion attached to the prime mover case or the mount base portion. This handling portion is constituted, for the convenience of manipulation thereof, by a front handle portion and a rear handle portion.

As shown in FIG. 3, the blade portion of the conventional working portion is constituted by a pair of upper and lower clipper blades 40 and 50, each of which having not only a plurality of triangular cutting edges 41 and 51 respectively, but also a plurality of guiding slots 42 and 52 respectively which are formed along the whole length of the clipper blades 40 and 50 at predetermined intervals.

An upper blade-supporting plate 60 is disposed on the upper surface of the upper clipper blade 40, and a lower blade-supporting plate 70 is disposed at the bottom surface of the proximal end portion of the lower clipper blade 50. The upper blade-supporting plate 60 is provided with a plurality of threaded holes 62.

The pair of the upper and lower clipper blades 40 and 50 are supported or cantilevered by means of the upper blade-supporting plate 60. Specifically, a plurality of guiding male screws 61 are introduced from the bottom side of the lower clipper blades 50 into the guiding slots 52 and 42, and further screwed into the threaded holes 62. The upper portions 61a of the guiding male screws 61 that have been protruded from the threaded holes 62 are screwed and clamped with locknuts 71. As a result, the pair of the upper and lower clipper blades 40 and 50 are respectively guided by the combination of the guiding male screws 61 with the guiding slots 42 and 52 so as to permit them to slide reciprocatingly in the longitudinal direction thereof.

The upper and lower clipper blades 40 and 50 are actuated, via an eccentric cam, etc. disposed in the transmission case, by the internal combustion engine so as to be reciprocatingly moved in opposite direction to each other with a phase shift of 180 degree, thus making it possible to carry out the cutting work of vegetation.

Because of the specific structure that the pair of the upper and lower clipper blades 40 and 50 are extended from and cantilevered by the main body of a hand-held power working machine such as a hedge trimmer, as well as because of the weight of the upper and lower clipper blades 40 and 50 which are made from a steel plate having a thickness of 2.5 mm (even though they are somewhat lightened by the formations of guiding slots 42 and 52), the cutting work with this hand-held power working machine by carrying the machine with both hands is very hard for an operator due to this cantilever type clipper blades 40 and 50.

Further, since the guiding slots 42 and 52 are formed only at the portions of the upper and lower clipper blades 40 and 50 where the several guiding male screws 61 are to be introduced for guiding these slots 42 and 52, the quenching rate at the occasion of heat treatment in the manufacture of the clipper blades 40 and 50 becomes non-uniform depending on the portion of the clipper blades 40 and 50, thus giving rise to the generation of strain or crack in the clipper blades 40 and 50. Furthermore, a stress concentration tends to occur at these slot portions during the operation of the clipper blades 40 and 50, thus giving rise to the generation of crack at these slot portions.

BRIEF SUMMARY OF THE INVENTION

This invention has been made to cope with the aforementioned problems, and therefore an object of the present invention is to provide clipper blades which are light in weight, can be suitably heat-treated in the manufacture thereof and are capable of minimizing the stress concentration in the operation thereof, thus making the clipper blades suited for use in a hand-held power working machine, etc.

With a view to realize the aforementioned object, this invention provides clipper blades essentially comprising plural cutting edges, and plural slots formed along a full length of each of the clipper blades, wherein the pitch of series of said cutting edges is substantially the same as the pitch of series of said slots.

In a specific preferred embodiment of this invention, said slots of the clipper blades are successively formed in a row along the longitudinal direction of each of the clipper blades, and the cutting edges are successively formed on both sides along the longitudinal direction of each of the clipper blades.

In an assembled state of the clipper blades according to this invention, the pair of upper and lower clipper blades are superimposed one upon another, and a blade-supporting plate having a plurality of threaded holes is superimposed on the upper surface of the upper clipper blade. A plurality of guiding male screws are inserted from the bottom side of the lower clipper blades into some of slots selected from the aforementioned plural slots so as to allow the tip end portion of each guiding male screw to be protruded from each of the threaded holes. The tip end portion of each guiding male screw is then screwed and clamped with a locknut.

According to the clipper blades of this invention which is constructed as mentioned above, since the same number of slots as that of the cutting edges are formed at substantially the same pitch as that of the cutting edges, the weight of clipper blades can be lightened as a whole as compared with the conventional clipper blades wherein the guiding slots are formed only several portions where the guiding male screws are to be inserted. Therefore, the weight of the clipper blades to be felt by the operator during working using the power work machine can be minimized, thus alleviating the load in a long period of cutting work.

Furthermore, since plural slots are successively formed at predetermined pitch along the longitudinal direction of each of the clipper blades, it is possible to effectively disperse the stress concentration to be generated at each slot as compared with the conventional clipper blades where only several slots are formed in the clipper blades, thus making it possible to obtain clipper blades which are easy to manufacture and good in strength.

DETAILED DESCRIPTION OF THE INVENTION

The clipper blades representing one embodiment of this invention will be explained with reference to the drawings.

Figure 1:
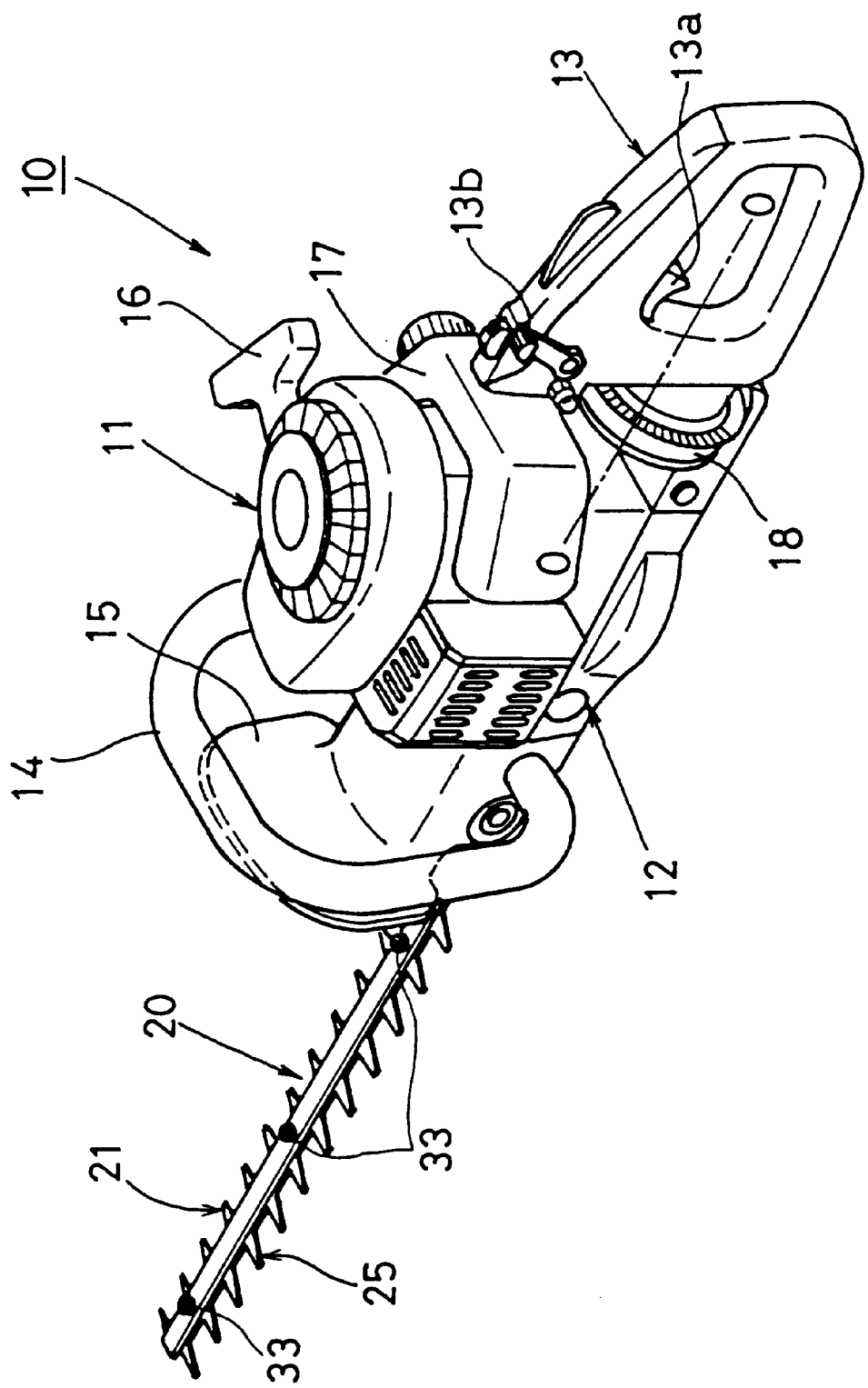
FIG. 1 is a perspective view illustrating a hedge trimmer provided with clipper blades representing one embodiment of this invention.

FIG. 1 shows a perspective view illustrating one embodiment of a hedge trimmer 10 provided with clipper blades according to this embodiment. The hedge trimmer 10 comprises an air-cooled two-stroke gasoline internal combustion engine 11, a mount base portion 12 enclosing a transmission case (not shown) having a power transmission device such as gears to be actuated by the internal combustion engine 11, a clipper blade portion 20 composed of a pair of upper and lower clipper blades 21 and 25 which are to be actuated via the aforementioned power transmission device by the internal combustion engine 11, a loop-shaped front handle portion 14 mounted on a forward portion of the mount base 12, a hand protector 15 disposed in the vicinity of the front handle portion 14, and a rear handle portion 13 mounted on a rearward portion 18 of the mount base 12.

A recoil starter 16 and a fuel tank 17 are attached to the internal combustion engine 11 to which a carburetor (not shown) having a throttle valve and an ignition plug (not shown) are installed. The pair of upper and lower clipper blades 21 and 25 constituting the clipper blade portion 20 are designed to be reciprocatingly driven in relative with each other, each moving in the longitudinal direction thereof, by means of the internal combustion engine 11 via the power transmission device such as a reciprocative motion device which is disposed in the transmission case. The rear handle portion 13 is mounted on the mount base 12 in such a manner that it can be pivotally rotated about an axial line 0—0, and that it can be locked at any rotated position. A throttle lever 13a and a sub-throttle lever 13b are attached to the rear handle portion 13.

Figure 2:
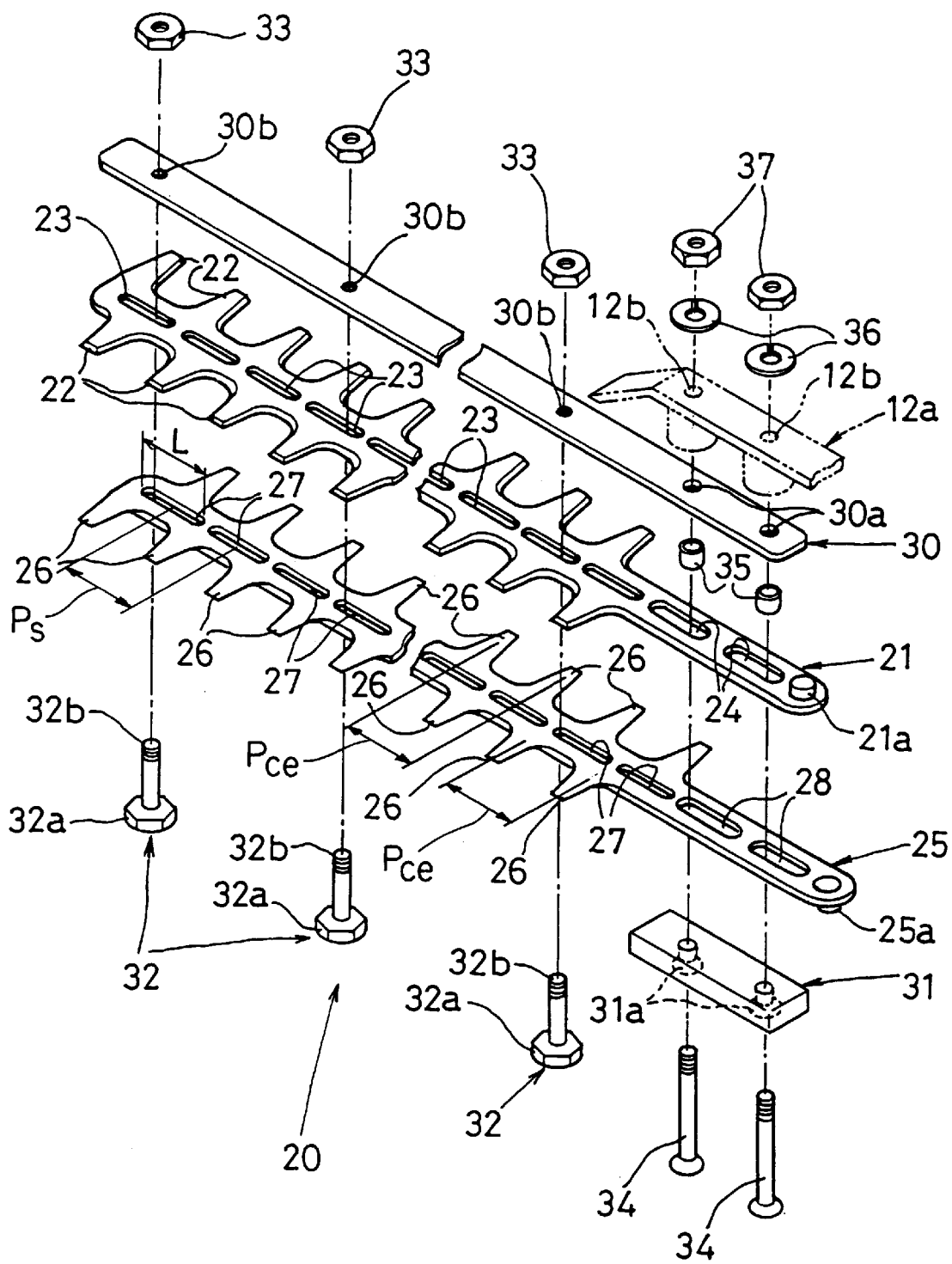
FIG. 2 is an exploded perspective view of the clipper blades shown in FIG. 1.
Figure 3:
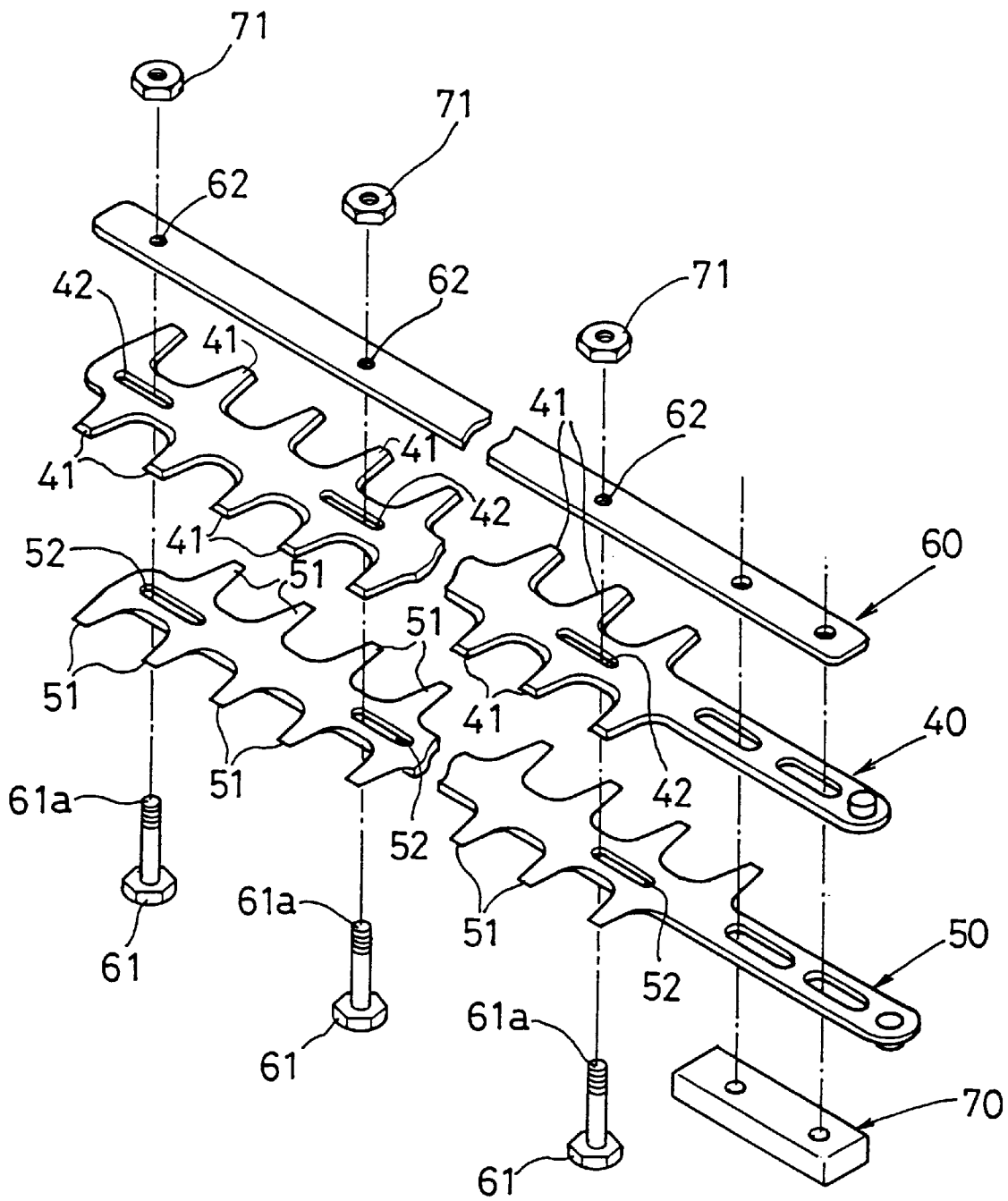
FIG. 3 is an exploded perspective view of the clipper blades of the prior art.

FIG. 2 shows an exploded perspective view illustrating the clipper blade portion 20 which is provided with the pair of upper and lower clipper blades 21 and 25 superimposed one upon another. These clipper blades 21 and 25 are provided respectively with a large number of triangular cutting edges 22 and 26 which are formed on both sides and along the longitudinal direction of each clipper blades 21 and 25. Furthermore, a large number of slots 23 and 27 are formed along a full length of each of the clipper blades 21 and 25, the pitch $P_S$ of the slots 23 and 27 being substantially the same as the array pitch $P_{ce}$ of the cutting edges 22 and 26. As used herein, the term "pitch" is used in the usual sense, as applied to regularly repeated elements of mechanical devices, namely, as the distance between corresponding points on the adjacent elements. See MERRIAM-WEBSTER'S COLLEGIATE DICTIONARY 886 (10th Ed. 1997).

An upper blade-supporting plate 30 is arranged on the upper surface of the upper clipper blade 21, and a lower blade-supporting plate 31 is disposed at the bottom surface the proximal end portion of the lower clipper blade 25. The upper blade-supporting plate 30 is provided with a plurality of threaded holes 30b at predetermined pitch, the number of the threaded holes 30b being smaller than the number of the slots 23 and 27.

The pair of clipper blades 21 and 25 are supported or cantilevered by means of the upper blade-supporting plate 30. Specifically, a guiding male screw 32 is inserted from the bottom side of the lower clipper blades 25 into specific slots 27 and 23 among a large number of slots 27 and 23, and further screwed into each of all threaded holes 30b. Then, the upper portion 32b of each guiding male screw 32 that has been protruded from the threaded hole 30b is screwed and clamped with a locknut 33, thus firmly clamping the guiding male screws 32 to the upper blade-supporting plate 30.

In this case, the clamping of the guiding male screws 32 to the upper blade-supporting plate 30 is performed in such a manner that the distance between the head 32a of the guiding male screws 32 and the upper blade-supporting plate 30 is slightly larger than the total thickness of the pair of the clipper blades 21 and 25. This clamping method is necessary for permitting the pair of the upper and lower clipper blades 21 and 25 to slide reciprocatingly in the longitudinal direction thereof, the reciprocative movements of them being guided by the combination of the guiding male screws 32 with the slots 23 and 27.

The right side portions of the pair of clipper blades 21 and 25 as well as the right side portions of the upper and lower blade-supporting plate 30 and 31 are designed to be mounted on the transmission case encircled by the mount base 12. Specifically, the clipper blades 21 and 25 are provided at these mounting portions with a pair of inner guiding slots 24 and 28 respectively. At the same time, projections 21a and 25a which are adapted to be engaged with a reciprocative movement mechanism (not shown) disposed in the transmission case are projected at the innermost (proximal) end portion of each of the clipper blades 21 and 25 so as to actuate the reciprocative movement of the clipper blades 21 and 25.

The upper and lower blade-supporting plates 30 and 31 are also provided respectively with a pair of bolt-holes 30a and 31a in conformity with each pair of the inner guiding slots 24 and 28 formed in the clipper blades 21 and 25.

The mounting of the clipper blade portion 20 on the transmission case encircled by the mount base 12 can be performed as follows. Namely, a pair of flush bolts 34 are introduced from the bottom side of the lower blade-supporting plate 31 into the bolt-holes 31a of the lower blade-supporting plate 31, and after being passed through the guiding slots 28 and 24 of the clipper blades 21 and 25, are introduced through the bolt-holes 30a of the lower blade-supporting plate 30 into the bolt-holes 12b of the supporting arm 12a extended from the transmission case. The tip end portions of these flush bolts 34 are then clamped respectively via a washer 36 by means of a locknut 37. As a result of clamping using the flush bolts 34 and locknuts 37, the upper blade-supporting plate 30 and the supporting arm 12a extended from the transmission case can be firmly and integrally fastened.

This clamping is performed under a condition that a guide collar 35 is kept in each of the guiding holes 24 and 28 of the pair of clipper blades 21 and 25, and each of the flush bolts 34 is introduced through this guide collar 35.

In this case, the thickness of the guide collar 35 is set slightly larger than the total thickness of the pair of the clipper blades 21 and 25 so as to permit the pair of the upper and lower clipper blades 21 and 25 to slide reciprocatingly in the different direction from each other even if the flush bolts 34 are firmly clamped with the locknuts 37.

The length of the slots 23 and 27 of the clipper blades 21 and 25 is all set to the same length "L", which is required for the clipper blades 21 and 25 to reciprocatingly move with a predetermined stroke. It should be noted that only some of many number of slots 23 and 27, i.e. the slots 23 and 27 in which the guiding male screws 32 are passed through are functioning as guiding slots for the reciprocative movement of the clipper blades 21 and 25. Accordingly, other remaining slots 23 and 27 where the guiding male screw 32 is not passed therethrough are functioning merely for lightening the weight of the clipper blades 21 and 25.

Next, the operation of the hedge trimmer 10 constructed according to this embodiment will be explained.

After the clipper blade portion 20 composed of the clipper blades 21 and 25 according to this embodiment is mounted on and secured to the hedge trimmer 10, the recoil starter 16 of the hedge trimmer 10 is manipulated to start the internal combustion engine 11. However, since the internal combustion engine 11 is still kept in a state of idling under this condition, the engine speed is still low so that the centrifugal clutch (not shown) disposed at the power input side of the power transmission device for actuating the clipper blade portion 20 cannot be put into a state of clutch-in, and hence the driving power of the engine 11 cannot be transmitted to the clipper blade portion 20, i.e. the reciprocating motion of the clipper blades 21 and 25 would not take place as yet.

Then, the throttle lever 13a and the sub-throttle lever 13b are manipulated while gripping the rear handle portion 13 and the front handle portion 14 with both hands so as to increase the output (revolving speed) of the engine 11. As a result, the centrifugal clutch is brought into a state of clutch-in, and the clipper blades 21 and 25 are allowed to reciprocatingly move in opposite direction to each other with a phase shift of 180 degree, thus making it possible to carry out the cutting work of a vegetation, etc.

Since the slots 23 and 27 are formed at pitch with the same pitch "P" as that of the cutting edges 22 and 26 in the clipper blades 21 and 25 according to this embodiment, it is possible to reduce the weight of the clipper blades 21 and 25 as a whole as compared with the conventional clipper blades where the guiding slots are formed only at the portions where the guiding male screws are to be introduced. As a result, the weight of the clipper blade portion 20, to be felt by the operator during working using the hedge trimmer 10 can be minimized, thus alleviating the load in a long period of cutting work.

Furthermore, although a large number of slots 23 and 27 are formed in the clipper blades 21 and 25, the relative position between the cutting edges 22 and 26 and the slots 23 and 27 functioning as a guide is not varied from that of the conventional clipper blades, so that it is possible even with this embodiment to excellently accomplish not only the supporting of the clipper blades 21 and 25, but also the guiding of the reciprocative motion of the clipper blades 21 and 25 as in the case of the conventional clipper blades.

Furthermore, since the clipper blades 21 and 25 according to this embodiment are simply modified in the respect that the number of the slots formed therein is increased as compared with that of the prior art, the cutting work of material as well as the number of working steps are the same as those of the prior art, so that any increase in manufacturing cost can be avoided.

Furthermore, since a large number of slots are successively formed at predetermined pitch along the longitudinal direction of each of the clipper blades 21 and 25, it is possible to effectively disperse the stress concentration to be generated at each slot as compared with the conventional clipper blades where only limited number of slots are formed in the clipper blades, thus making it possible to obtain clipper blades 21 and 25 which are easy to manufacture and good in strength.

Additionally, since a large number of slots are successively formed at predetermined pitch along the longitudinal direction of each of the clipper blades 21 and 25, it is possible to realize a uniform quenching rate throughout the entire regions of the clipper blades 21 and 25, thus making it possible to improve the quality of heat-treated product.

Moreover, since a large number of slots are successively formed along the longitudinal direction of each of the clipper blades 21 and 25 from the beginning, it is possible to utilize any of the slots as a guiding slot, i.e. to change the location of the guiding slot, when it is desired to increase the number of guiding portion in conformity with requirements to increase the number of the guiding male screws.

In the foregoing explanation, the present invention has been explained with reference to one embodiment. However, the present invention should not be construed to be limited by this embodiment, but may be variously modified within the spirit of this invention claimed in the appended claims.

For example, only one example of clipper blades of double-sided cutting edge type is explained in the foregoing embodiment. However, it is also possible to apply this invention to single-sided cutting edge type clipper blades. Further, this invention is applicable not only to the clipper blades of a hedge trimmer but also to the clipper blades of other kinds of working machine.

As apparent from the foregoing explanations, since the clipper blade according to this invention is constructed such that the slots are formed in the same pitch as that of the cutting edges, the weight of the clipper blades can be reduced in weight, the clipper blades can be suitably heat-treated in the manufacture thereof, and the stress concentration at the slot portion during the operation thereof can be minimized.

I claim:

1. A working machine comprising a pair of elongated clipper blades, each clipper blade having a plurality of cutting edges along at least one side, the cutting edges having a pitch, and a plurality of slots formed along the entire length of the blade and having a pitch substantially equal to the pitch of the cutting edges.

2. A working machine according to claim 1, wherein the slots of each blade are aligned in a row extending longitudinally of the blade and wherein each blade has cutting edges along both sides.

3. A working machine according to claim 2 and further comprising a blade-supporting plate having a plurality of threaded holes, the blade-supporting plate being superimposed over the pair of blades and the blades being coupled to the blade-supporting plate by guiding male screws received from below the pair of cutting blades through selected ones of the slots in each blade, a threaded tip end portion of each guiding male screw being threaded through a threaded hole in the blade-supporting plate and protruding above the blade-supporting plate and receiving a lock nut.

4. A working machine according to claim 3 wherein all of the slots of the pair of blades are identical.

5. A working machine according to claim 1 and further comprising a blade-supporting plate having a plurality of threaded holes, the blade-supporting plate being superimposed over the pair of blades and the blades being coupled to the blade-supporting plate by guiding male screws received from below the pair of cutting blades through selected ones of the slots in each blade, a threaded tip end portion of each guiding male screw being threaded through a threaded hole in the blade-supporting plate and protruding above the blade-supporting plate and receiving a lock nut.

6. A working machine according to claim 5, wherein all of the slots of the pair of blades are identical.

* * * * *